US008438888B2

(12) United States Patent
Akizuki et al.

(10) Patent No.: US 8,438,888 B2
(45) Date of Patent: May 14, 2013

(54) DOOR LOCK DEVICE FOR VEHICLE

(75) Inventors: Ryujiro Akizuki, Novi, MI (US); Takashi Nishio, Kariya (JP); Nobuko Watanabe, Anjo (JP); Kazunori Kojima, Aichi-gun (JP); Sho Sannohe, Chiryu (JP); Yusuke Yamada, Chiryu (JP); Yasuhiko Sono, Hekinan (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/386,883

(22) PCT Filed: Jun. 30, 2010

(86) PCT No.: PCT/JP2010/061498

§ 371 (c)(1),
(2), (4) Date: Jan. 24, 2012

(87) PCT Pub. No.: WO2011/010553

PCT Pub. Date: Jan. 27, 2011

(65) Prior Publication Data

US 2012/0118029 A1 May 17, 2012

(30) Foreign Application Priority Data

Jul. 24, 2009 (JP) ................................ 2009-173170

(51) Int. Cl.
*B60R 25/00* (2006.01)

(52) U.S. Cl.
USPC ......................... 70/237; 70/252; 292/DIG. 23

(58) Field of Classification Search .................... 70/237, 70/238, 379 R, 380, 256, 257, 279.1, 461, 70/465, 252; 292/144, 201, DIG. 23
See application file for complete search history.

(56) References Cited

U.S. PATENT DOCUMENTS 4,936,122 A * 6/1990 Osada ............................ 70/214
5,931,035 A * 8/1999 Bolton ............................ 70/367

(Continued)

FOREIGN PATENT DOCUMENTS

DE 196 50 136 A1 6/1998
EP 1 577 471 A1 9/2005

(Continued)

OTHER PUBLICATIONS

International Search Report (PCT/ISA/210) issued on Sep. 21, 2010, by Japanese Patent Office as the International Searching Authority for International Application No. PCT/JP2010/061498.
Written Opinion (PCT/ISA/237) issued on Sep. 21, 2010, by Japanese Patent Office as the International Searching Authority for International Application No. PCT/JP2010/061498 (in Japanese).

(Continued)

*Primary Examiner* — Suzanne Barrett
(74) *Attorney, Agent, or Firm* — Buchanan Ingersoll & Rooney PC

(57) ABSTRACT

A door lock device includes a lever mechanism which carries out lock/unlock operation in response to turn operation of a key cylinder. The lever mechanism includes a key rotor which includes a coupling hole to which an inner end of a rod is coupled in a torque transmittable manner and is rotatably assembled to a housing, and a key lever which includes a hub which is coupled to the key rotor in a torque transmittable manner and is arranged in the housing. The key lever includes a first arm which extends to radial outward direction from the hub and is capable of engaging with a first engagement portion of the active lever, and a second arm which extends to radial outward direction from the hub and is capable of engaging with a second engagement portion of the active lever.

6 Claims, 11 Drawing Sheets

U.S. PATENT DOCUMENTS

| | | | | |
|---|---|---|---|---|
| 6,007,117 | A | 12/1999 | Spindler | |
| 6,439,011 | B1 * | 8/2002 | Frick et al. | 70/185 |
| 6,938,446 | B2 | 9/2005 | Fukunaga et al. | |
| 7,055,351 | B2 * | 6/2006 | Suzuki et al. | 70/186 |
| 7,121,126 | B2 * | 10/2006 | Zillmann | 70/186 |
| 7,213,428 | B2 * | 5/2007 | Harada et al. | 70/256 |
| 7,302,818 | B2 * | 12/2007 | Usuzaki et al. | 70/256 |
| 7,703,310 | B2 | 4/2010 | Usuzaki et al. | |
| 7,823,426 | B2 * | 11/2010 | Okuno et al. | 70/186 |
| 8,001,814 | B2 * | 8/2011 | Okada et al. | 70/186 |
| 8,033,148 | B2 * | 10/2011 | Okada et al. | 70/186 |
| 2009/0266122 | A1 * | 10/2009 | Okada et al. | 70/252 |
| 2010/0064742 | A1 * | 3/2010 | Okada et al. | 70/185 |

FOREIGN PATENT DOCUMENTS

| | | | |
|---|---|---|---|
| JP | 2005-133320 | A | 5/2005 |
| JP | 2005-282095 | | 10/2005 |
| JP | 3777968 | B2 | 5/2006 |
| JP | 3914149 | B2 | 5/2007 |
| JP | 2008-240451 | A | 10/2008 |

OTHER PUBLICATIONS

Extended European Search Report issued Nov. 12, 2012 by the European Patent Office in European Application No. 10802173.4 (5 pages).

* cited by examiner

DOOR LOCK DEVICE FOR VEHICLE

TECHNICAL FIELD

The present invention relates to a door lock device for a vehicle.

RELATED ART

One example of a door lock devices for a vehicle includes a lever mechanism connected to a key cylinder arranged on an outside handle of a vehicle door through a rod, and carries out a lock operation/unlock operation (locking/unlocking) in response to turn operation of the key cylinder, as disclosed in JP3777968B.

In the door lock device for a vehicle disclosed in the above-mentioned JP3777968B in the related art, as shown in FIGS. 15 and 16, the lever mechanism includes: a key rotor 1 rotatably assembled to a housing 2, the key rotor 1 having a coupling hole 1*a* to which an inner end 9*a* of the rod 9 is inserted in the vehicle width direction and coupled in a torque transmittable manner; a key lever 3 arranged in the housing 2, the key lever 3 having a hub 3*a* rotatably supported by the housing 2 and the key rotor 1 and coupled to the key rotor 1 in a torque transmittable manner; and an idle lever 4 rotatably assembled to a support shaft 3*a*1 provided in the hub 3*a* of the key lever 3. The idle lever 4 includes a round hole 4*a* in which the support shaft 3*a*1 is rotatably fit, an arc-shaped slot 4*b*, formed such that a center of the arc shape locates at the round hole 4*a*, which is capable of receiving a projection 3*a*2 provided in the hub 3*a*, and a U-shaped pawl portion 4*c* which clamps a projection 5*a* of an active lever 5 rotatably assembled in the housing 2.

Accordingly, in the case where the key cylinder is operated by a key to turn from a default state (state where the key can be inserted to and pulled out from the key cylinder) toward a lock direction when the active lever 5 is in an unlock state, the key rotor 1 is rotated in the lock direction through the rod 9, and the key lever 3 rotates to the lock direction integrally with the key rotor 1. By the rotation of the key lever 3, the projection 3*a*2 of the key lever 3 moves in the arc-shaped slot 4*b* of the idle lever 4 by a predetermined amount and after that the projection 3*a*2 engages with one end wall of the arc-shaped slot 4*b*, so that the key lever 3 and the idle lever 4 integrally rotates toward the lock direction. Thus, the projection 5*a* of the active lever 5 is pushed toward the lock direction by the U-shaped pawl portion 4*c* of the idle lever 4, so that the active lever 5 turns toward the lock direction.

Meanwhile, in the case where the key cylinder is operated by the key to turn from the default state to an unlock direction when the active lever 5 is in a lock state, the key rotor 1 is rotated to the unlock direction through the rod 9, and the key lever 3 rotates to the unlock direction integrally with the key rotor 1. By the rotation of the key lever 3, the projection 3*a*2 of the key lever 3 moves in the arc-shaped slot 4*b* of the idle lever 4 by a predetermined amount and after that the projection 3*a*2 engages with the other end wall of the arc-shaped slot 4*b*, so that the key lever 3 and the idle lever 4 integrally rotates to the unlock direction. Thus, the projection 5*a* of the active lever 5 is pushed toward the unlock direction by the U-shaped pawl portion 4*c* of the idle lever 4, so that the active lever 5 turns toward the unlock direction.

Notably, when the active lever 5 is in the lock state, a lock/unlock member (an open link) actuated so that the door is opened relative to the vehicle body, is held in the locking position (lock position), and therefore, even when door-opening operation is performed on the outside handle, the open mechanism is not actuated and the vehicle door is not opened relative to the vehicle body.

Meanwhile, when the active lever 5 is in the unlock state, the lock/unlock member (the open link) is held in the unlocking position (unlock position) to allow actuation of the open mechanism, and therefore, when the outside handle is operated, the open mechanism is actuated and the vehicle door is opened relative to the vehicle body.

SUMMARY OF THE INVENTION

According to the door lock device for a vehicle disclosed in the above-mentioned JP3777968B of the related art, the lever mechanism have three components (the key rotor 1, the key lever 3, and the idle lever 4) as shown in FIGS. 15 and 16, and it is therefore desired to reduce the number of components.

The present invention is derived to solve the above-mentioned problem. The door lock device for a vehicle according to the present invention includes a lever mechanism which is adapted to link through a rod with a key cylinder arranged on an outside handle of a vehicle door and which carries out a lock/unlock operation in response to turn operation of the key cylinder. The lever mechanism includes a key rotor including a coupling hole to which an inner end of the rod is inserted in the vehicle width direction and coupled in a torque transmittable manner and being rotatably assembled to a housing, and a key lever including a hub rotatably supported by the housing and the key rotor and coupled to the key rotor in a torque transmittable manner and being arranged in the housing. The key lever includes a first arm which extends to radial outward direction from the hub and is capable of engaging with a first engagement portion of an active lever rotatably assembled in the housing, and a second arm which extends to radial outward direction from the hub and is capable of engaging with a second engagement portion of the active lever. Then, in the case where the key cylinder is operated to turn toward a lock direction from a default state when the active lever is in an unlock state, the first arm of the key lever moves by a predetermined amount and after that engages with the first engagement portion of the active lever, so that the active lever is turned in the lock direction. In the case where the key cylinder is operated to turn toward an unlock direction from the default state when the active lever is in a lock state, the second arm of the key lever moves by a predetermined amount and after that engages with the second engagement portion of the active lever, so that the active lever is turned in the unlock direction.

According to the door lock device for the vehicle of the present invention, an actuation in the case where the key cylinder is operated to turn from the default state toward the lock direction when the active lever is in the unlock state, and an actuation in the case where the key cylinder is operated to turn from the default state toward the unlock direction when the active lever is in the lock state, are substantially same as the respective corresponding actuation achieved in the door lock device for the vehicle disclosed in the above-mentioned door lock device for the vehicle in the related art. In addition, the lever mechanism, which carries out lock/unlock operation in response to turn operation of the key cylinder, is provided with the key rotor and the key lever, however the idle lever is eliminated. Thus, the idle lever is not necessary for the lever mechanism and it enables more simple and inexpensive configuration of the lever mechanism of the door lock device.

Upon implementation of the present invention described above, the first arm and the second arm may be provided so as to be displaced each other in the direction of a rotation axis of the key lever. The first arm may be incapable of engaging with the second engagement portion and the second arm may be incapable of engaging with the first engagement portion. In this case, the second arm and the first engagement portion can be arranged so as to be superposed in the direction of the rotation axis in the unlock state since the second arm is incapable of engaging with the first engagement portion. Moreover, the first arm and the second engagement portion can be arranged so as to be superposed in the direction of the rotation axis in the lock state since the first arm is incapable of engaging with the second engagement portion. Accordingly, a gap between the first arm and the second arm can be reduced to prevent the key lever from being large size.

A weak portion may be provided between the hub and the second arm of the key lever. The weak portion is collapsible when the rod is pushed to move toward the key lever by a force equal to or more than a predetermined value. Therefore, when the rod is pushed to move by the force equal to or more than a predetermined value, the key lever collapses at the weak portion. As a result, rotation is not transmitted from the hub to the second arm in the key lever. Thus, even when the key rotor is rotated to the unlock direction, the active lever is not turned to the unlock direction. Accordingly, an anti-theft function of the door lock device can be improved.

A collapse assisting portion that assists collapse at the weak portion of the key lever when the rod is pushed to move toward the key lever by the force equal to or more than a predetermined value may be provided on the housing. By virtue of this configuration, collapse of the weak portion of the key lever can be ensured in the case where the rod is pushed to move toward the key lever by the force equal to or more than a predetermined value in comparison to the case where the collapse assisting portion is not provided in the housing, and thereby the anti-theft function of the door lock device can further be enhanced.

The collapse assisting portion may be configured by an arc-shaped rib which extends in an arc shape centering around a circular portion rotatably supporting the key lever, and a straight rib which extends on an inner circumference side of the arc-shaped rib. In this case, the straight rib may extend from the circular portion toward an intermediate portion of the arc-shaped rib, and the straight rib and the arc-shaped rib may be slightly separated from each other.

Upon implementation of the present invention described above, the key rotor and the key lever may coaxially be arranged and integrated to each other. In this case, the lever mechanism can be configured by a single component, which enables more simple and inexpensive configuration of the lever mechanism of the door lock device.

DETAILED DESCRIPTION OF THE INVENTION

Figure 1:
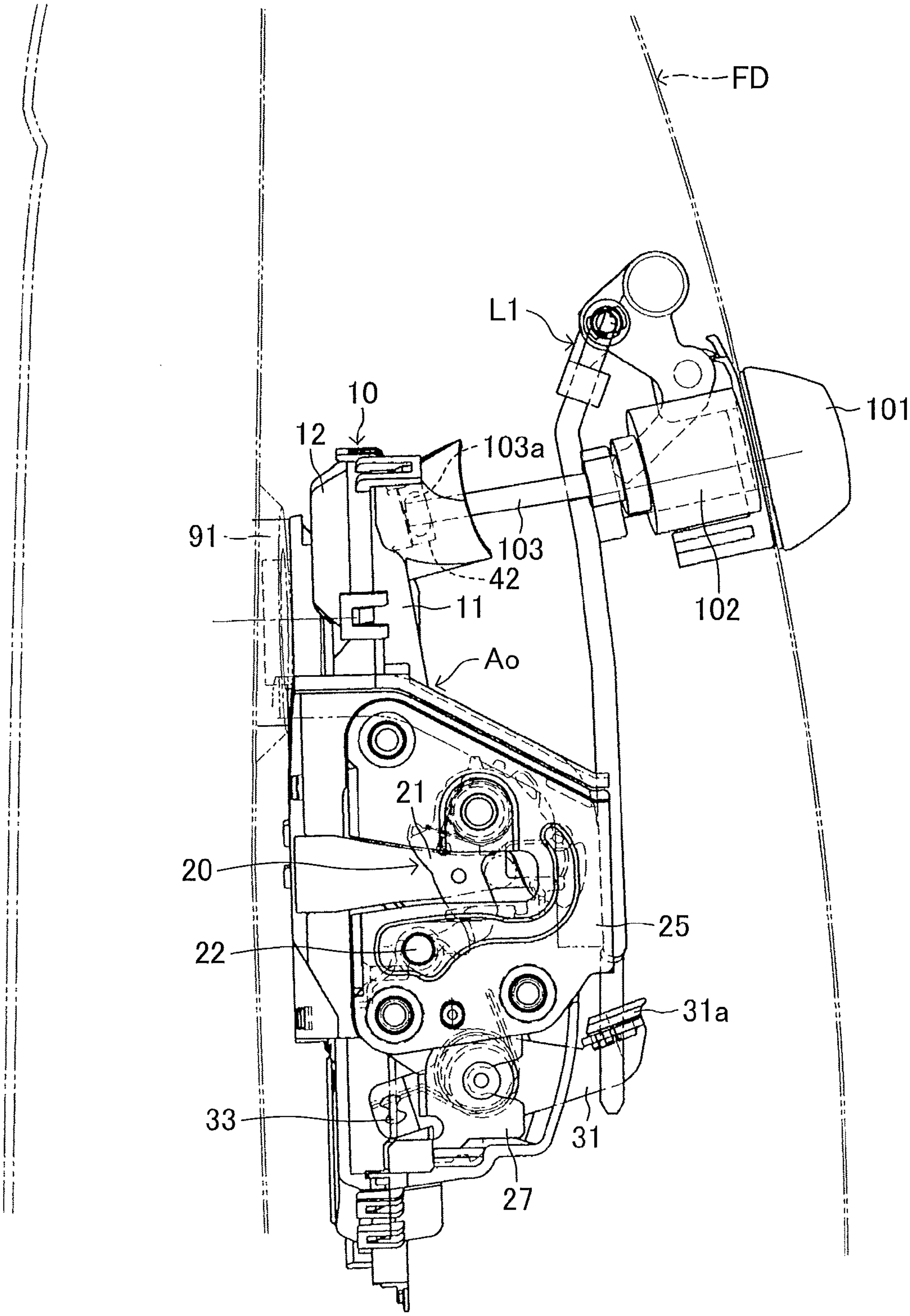
FIG. 1 is a rear view of a door lock device for a vehicle according to an embodiment of the present invention, which is arranged inside a door and shown from the rear side of the door.
Figure 2:
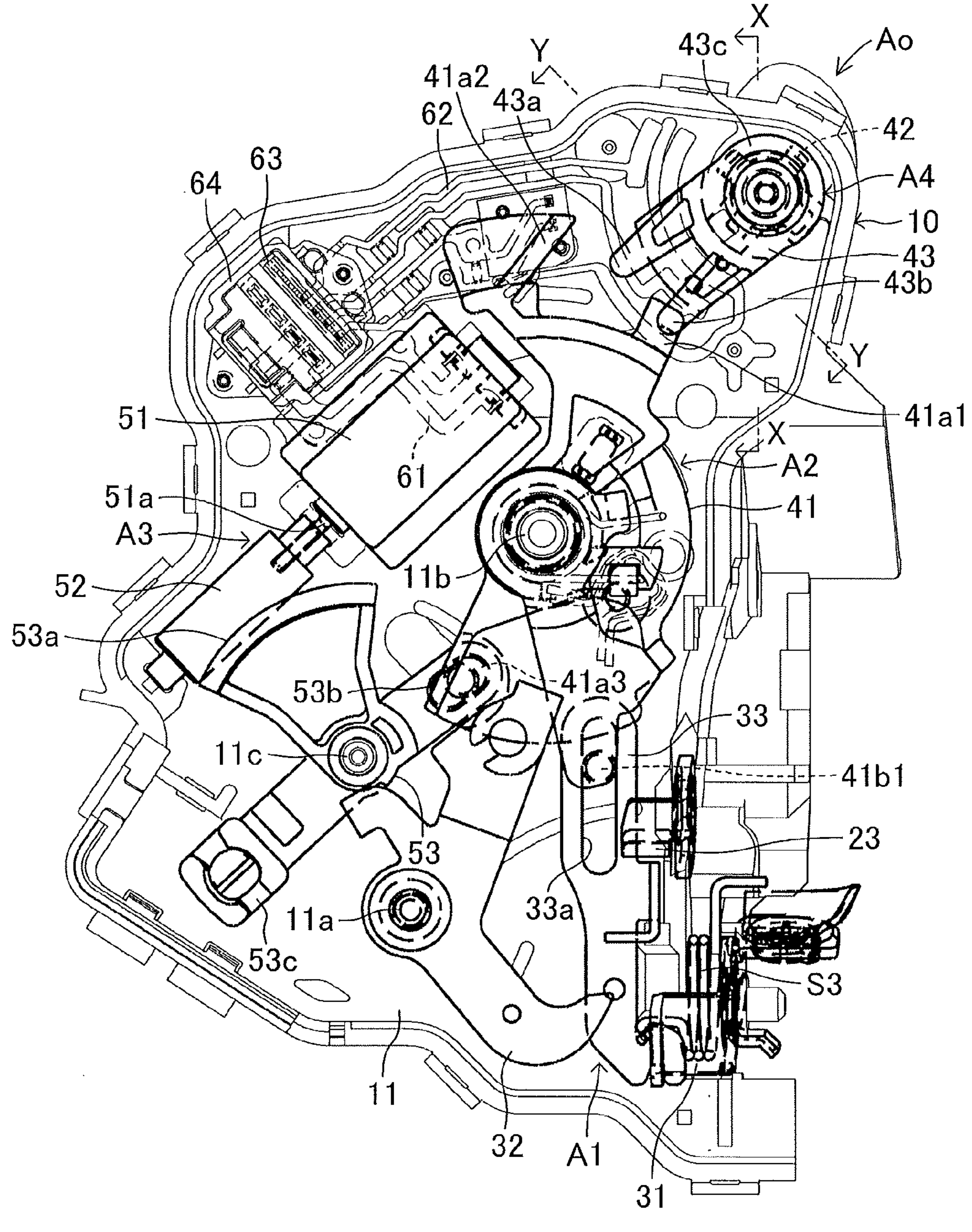
FIG. 2 is a side view of a major configuration in an unlock state of the door lock device for the vehicle shown in FIG. 1 observed from the vehicle interior.
Figure 3:
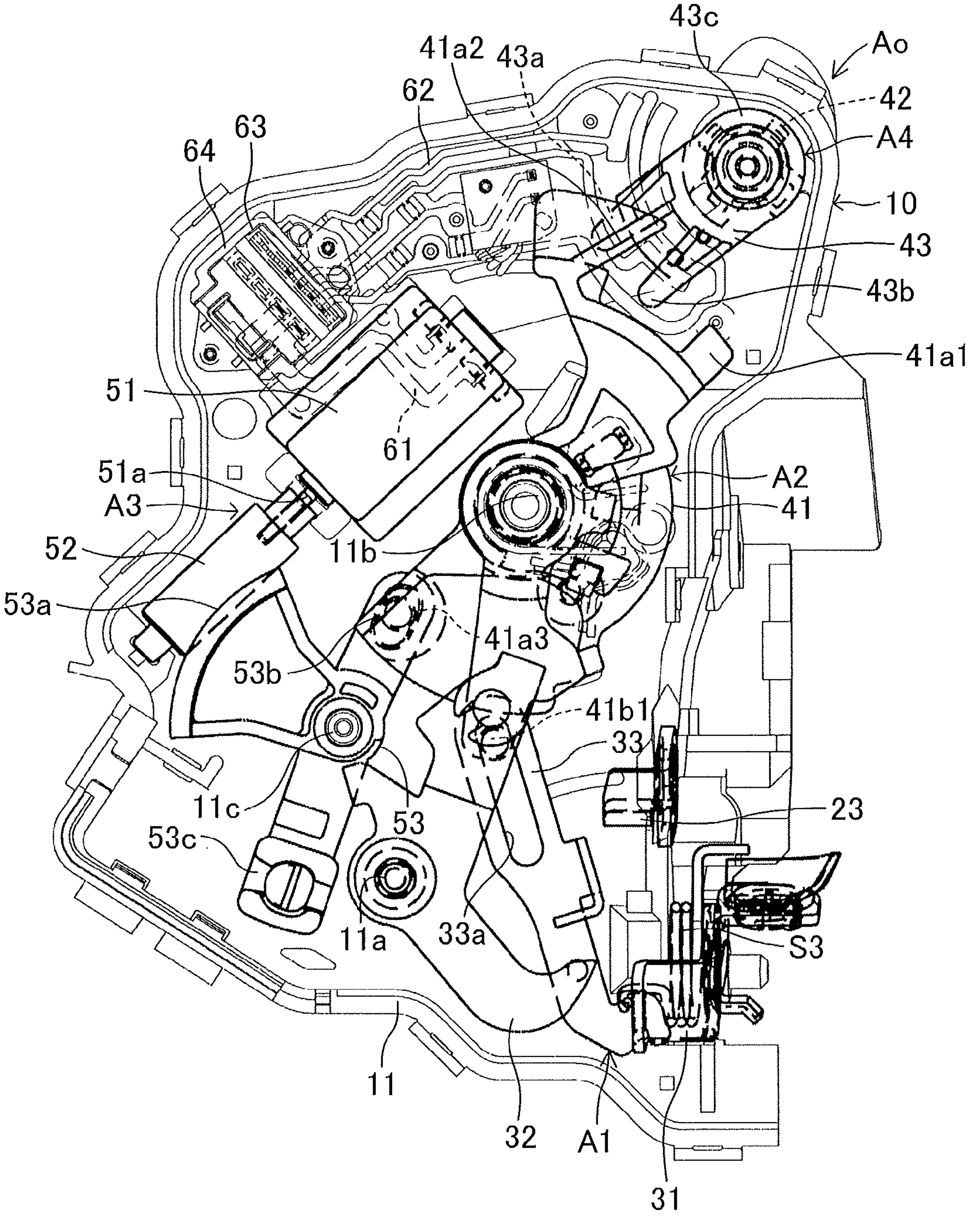
FIG. 3 is a side view of the major configuration in a lock state of the door lock device for the vehicle shown in FIG. 1 observed from the vehicle interior.
Figure 4:
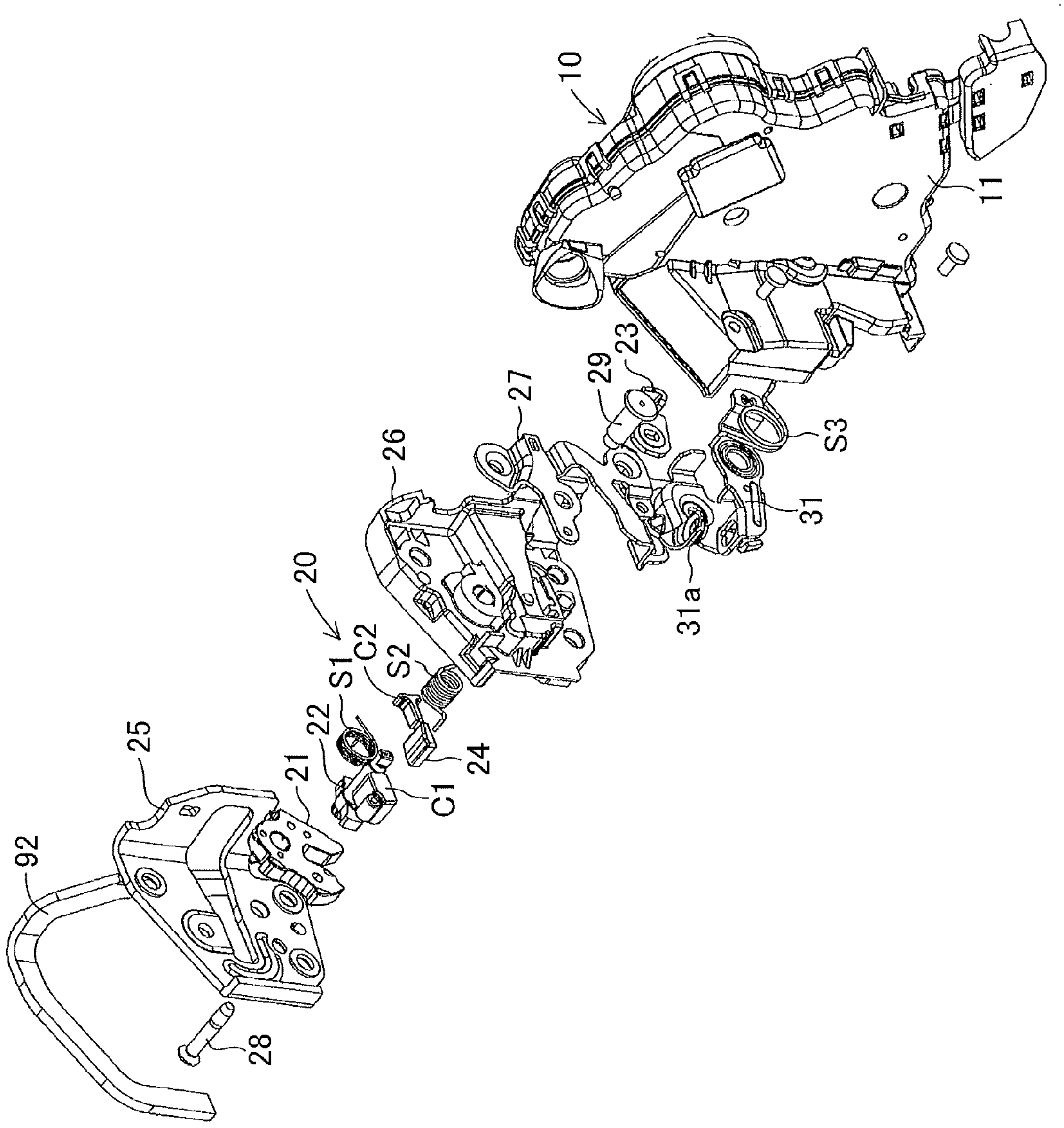
FIG. 4 is an exploded perspective view of a part of an open mechanism and a latch mechanism in the door lock device for the vehicle shown in FIGS. 1 to 3.
Figure 5:
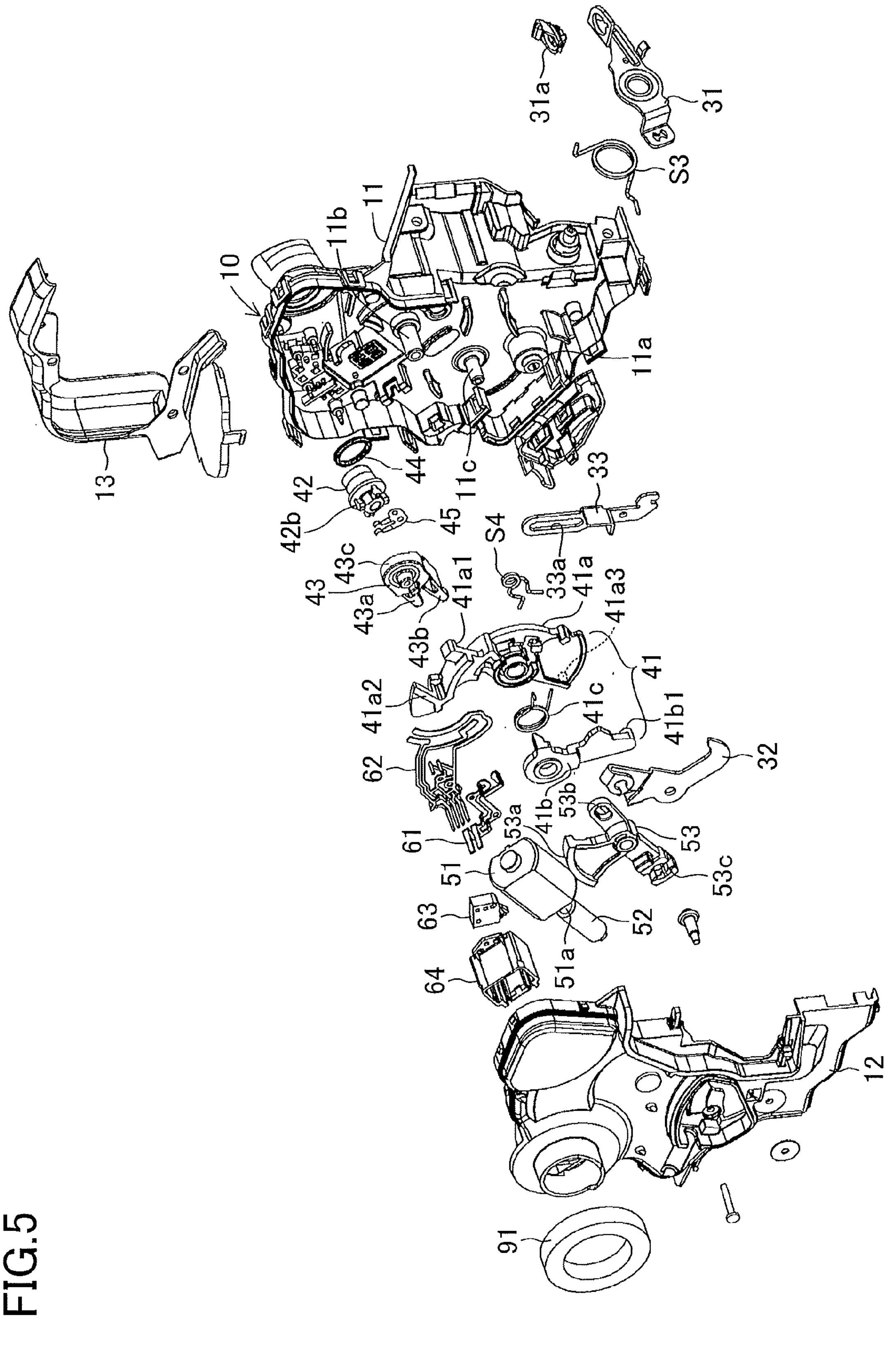
FIG. 5 is an exploded perspective view of the open mechanism, a lock mechanism, an electric actuator, and the like in the door lock device for the vehicle shown in FIGS. 1 to 3.

Hereinafter, an embodiment of the present invention will be described with reference to the drawings. FIGS. 1 to 5 show a door lock device for a vehicle Ao according to the present invention. The door lock device for the vehicle Ao is attached to a door FD mounted on the front right side of a vehicle, and as shown in FIGS. 2 and 3, provided with an open mechanism A1, a lock mechanism A2, an electric actuator A3, and a housing 10 accommodating the open mechanism A1, the lock mechanism A2, and the electric actuator A3. As shown in FIGS. 1, 4, and 5, the housing 10 includes a housing body 11, a housing cover 12 assembled into the housing body 11, and a protector 13 (refer to FIG. 5) assembled into the housing body 11 and the housing cover 12. It should be noted that a seal ring 91 is assembled between the housing cover 12 and an inner plate of the door FD.

The open mechanism A1 is provided for actuating a known latch mechanism 20 (refer to FIGS. 1 and 4) from a latch state to an unlatch state in a manner that the door FD is openable relative to a vehicle body. The latch mechanism 20 is used for retaining the door FD in a closed state relative to the vehicle body (state where the door FD is closed), and provided with a latch 21 engageable with and disengageable from a striker (not shown) fixed to the vehicle body. It should be noted that the latch mechanism 20 is not shown in FIGS. 2 and 3 but shown in an exploded state in FIG. 4, and assembled into the door FD in a state where the latch mechanism is assembled into the housing 10 (refer to FIG. 1).

The latch mechanism 20 is engaged with the striker so as to retain the door FD in the closed state (latch state). With the door FD in the closed state, the latch mechanism 20 is disengaged from the striker, so that the door FD is switched from the closed state to an opened state (state where the door is openable relative to the vehicle body) (unlatch state). As shown in FIG. 4, the latch mechanism 20 includes the latch 21, a pawl 22, a lift lever 23, and a stopper 24. The latch mechanism 20 further includes cushions C1, C2, a latch torsion spring S1, and a pawl torsion spring S2. These constituent parts are assembled into a base plate 25, a case 26, and a sub base plate 27 by means of a screw 28 and a pin 29. It should be noted that the base plate 25 is assembled into the door FD through a seal member 92 (not shown in FIG. 1 and shown in FIG. 4).

As shown in FIGS. 2 and 3, the open mechanism A1 includes an outside open lever 31, an inside open lever 32, and an open link 33 (lock/unlock member). The outside open lever 31 is assembled into the housing body 11 together with a torsion spring S3, linked with an outside handle 101 (refer to FIG. 1) provided on the outdoor side of the door FD through the linkage mechanism L1, and operated to rotate clockwise in FIG. 1 by pull operation of the outside handle 101. It should be noted that a clip 31*a* (refer to FIGS. 1, 4, and 5) is assembled into the outside open lever 31.

The inside open lever 32 is rotatably assembled to a support shaft 11*a* provided in the housing body 11, linked with an inside handle (not shown) provided on the indoor side of the door FD, and operated to rotate counterclockwise in FIGS. 2 and 3 by pull operation of the inside handle. The open link 33 is movably coupled to and supported on the outside open lever 31 at a lower end thereof. The open link 33 is movable between an unlock position shown in FIG. 2 and a lock position shown in FIG. 3 by an active lever 41 serving as a constituent part of the lock mechanism A2. When the open link 33 is at the unlock position shown in FIG. 2, the open link 33 is engageable with the lift lever 23 of the latch mechanism 20 so that the door FD is openable. When the open link 33 is at the lock position shown in FIG. 3, the open link 33 is not engageable with the lift lever 23 of the latch mechanism 20.

The open link 33 is moved from the positions shown in FIGS. 2 and 3 to the upward direction of the device (toward the upper side in FIGS. 2 and 3) upon receiving operation of the outside open lever 31 (pull operation of the outside handle 101) or receiving operation of the inside open lever 32 (pull operation of the inside handle). Therefore, in the case where the open link 33 moves from the unlock position shown in FIG. 2 to the upward direction upon receiving operation of the outside open lever 31 or the inside open lever 32 when the door FD is closed, the lift lever 23 of the latch mechanism 20 is pushed to turn by the open link 33, so that the latch mechanism 20 is actuated from the latch state to the unlatch state. Thereby, the door FD is switched from the closed state to the opened state. That is, when the open link 33 is at the unlock position shown in FIG. 2, the door FD is unlocked.

Meanwhile, in the case where the open link 33 moves from the lock position shown in FIG. 3 to the upward direction upon receiving operation of the outside open lever 31 or the inside open lever 32 when the door FD is closed, the open link 33 is not engaged with the lift lever 23 of the latch mechanism 20, so that the latch mechanism 20 is maintained in the latch state. Thereby, the door FD is maintained in the closed state. That is, when the open link 33 is at the lock position shown in FIG. 3, the door FD is locked.

Figure 6:
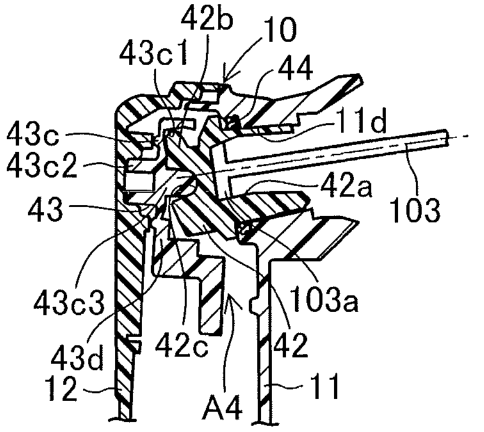
FIG. 6 is a cross sectional view taken along a X-X line in FIG. 2, showing a relation among a key rotor, a key lever, and a housing shown in FIGS. 2, 3, 5, and 6.
Figure 7:
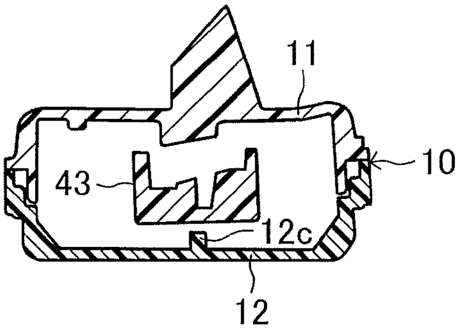
FIG. 7 is a cross sectional view taken along a Y-Y line in FIG. 2, showing a relation between the key lever and the housing.
Figure 8:
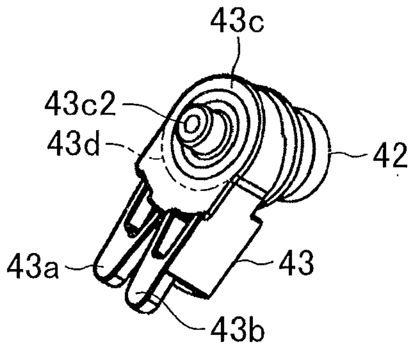
FIG. 8 is a perspective view of the key rotor and the key lever shown in FIG. 5, which are assembled each other.

The lock mechanism A2 is provided for restraining or permitting actuation of the open mechanism A1 so as to lock or unlock the door FD, provided with the above active lever 41, and also provided with a lever mechanism A4 to move the above open link 33 to the lock position or the unlock position through the active lever 41. As shown in FIGS. 2, 3, and 6, the lever mechanism A4 includes a key rotor (sometimes referred to "key outside locking lever") 42 and a key lever (sometimes referred to "key switch lever") 43. The lever mechanism A4 is connected to a key cylinder 102 located on the outside handle 101 through a rod 103 at the key rotor 42 as shown in FIG. 1. Therefore, it is possible for the lever mechanism A4 to carry out lock operation (operation to move the open link 33 from the unlock position to the lock position through the active lever 41) or unlock operation (operation to move the open link 33 from the lock position to the unlock position through the active lever 41), in response to turn operation (mechanical key operation by a key) of the key cylinder 102.

The active lever 41 is assembled to a support shaft 11*b* provided in the housing body 11 together with a torsion spring S4 (refer to FIG. 5), and rotatably supported on the support shaft 11*b*. As shown in FIG. 5, the active lever 41 includes a main lever 41*a*, a sub lever 41*b*, and a twisted spring 41*c*. The main lever 41*a* is rotatably assembled to the support shaft 11*b*, and has a first engagement portion 41*a*1 engageable and linked with a first arm 43*a* of the key lever 43, a second engagement portion 41*a*2 engageable and linked with a second arm 43*b* of the key lever 43, and an engagement portion (pin portion) 41*a*3 linked with the electric actuator A3. The sub lever 41*b* is rotatably assembled to the support shaft 11*b*. The sub lever 41*b* is rotatable relative to the main lever 41*a* by a predetermined amount, and has an engagement portion (pin portion) 41*b*1 linked with a long hole 33*a* of the open link 33.

The twisted spring 41*c* (bias member) is placed between the main lever 41*a* and the sub lever 41*b*, similarly to the twisted spring described in JP2006-266026A, to rotate and bias the sub lever 41*b* in one direction (counterclockwise in FIGS. 2 and 3) relative to the main lever 41*a*. Therefore, the main lever 41*a* and the sub lever 41*b* integrally rotate in the clockwise direction in FIGS. 2 and 3 (lock direction), and rotate through the twisted spring 41*c* in the unlock direction.

As shown in FIG. 6, the key rotor 42 includes a coupling hole 42*a* to which an inner end 103*a* of the rod 103 is inserted in the vehicle width direction and coupled in a torque transmittable manner, and is rotatably assembled to a through hole 11*d* provided on the housing body 11 of the housing 10 through a seal ring 44. Moreover, the key rotor 42 includes a coupling projection 42*b* which is coupled to a non-circular coupling hole 43*c*1 provided in a hub 43*c* of the key lever 43 in a torque transmittable manner.

As shown in FIG. 5 and FIGS. 8 to 10, the key lever 43 includes the hub 43*c* connected to the key rotor 42 in a torque transmittable manner, the first arm 43*a* extending toward radial outward direction from the hub 43*c* and engageable with the first engagement portion 41*a*1 of the main lever 41*a* of the active lever 41, and the second arm 43*b* extending toward radial outward direction from the hub 43*c* and engageable with the second engagement portion 41*a*2 of the main lever 41*a*. The first arm 43*a* and the first engagement portion 41*a*1 are displaced by a predetermined amount toward the vehicle outside direction (housing body 11 side) from the second arm 43*b* and the second engagement portion 41*a*2 (that is, the first arm 43*a* and the second arm 43*b* as well as the first engagement portion 41*a*1 and the second engagement portion 41*a*2 are provided while displaced by a predetermined amount respectively in the direction of the rotation axis of the key lever 43), so that, upon turning of the key lever 43, the first arm 43*a* does not engage with the second engagement portion 41*a*2 (refer to (a) and (b) of FIG. 10), and the second arm 43*b* does not engage with the first engagement portion 41*a*1 (refer to (a) of FIG. 9).

As shown in FIG. 6, the key lever 43 is rotatably supported by the housing cover 12 of the housing 10 at a shaft portion 43*c*2 provided on the hub 43*c*. Furthermore, the key lever 43 is rotatably supported by a support hole portion 42*c* of the key rotor 42 at a projection portion 43*c*3 provided on the hub 43*c*. By virtue of this configuration, the key lever 43 is rotatably assembled to the housing 10 while coupled to the key rotor 42 (refer to FIGS. 6 and 8). It should be noted that a contact 45 (functioning so as to cooperate with a second terminal 62 described later) shown in FIG. 5 is assembled to the key lever 43.

As shown in FIGS. 2 and 3, the electric actuator A3 is provided to move the above open link 33 to the lock position or the unlock position through the active lever 41. The electric actuator A3 includes an electric motor 51, a worm 52, and a locking lever 53. The electric motor 51 is a known motor driven in response to a lock operation and an unlock operation. A first terminal 61, a second terminal 62, a switch 63, a connector 64, and the like are provided in the electric motor 51 for controlling an action thereof. The worm 52 is provided integrally with an output shaft 51*a* of the electric motor 51, and rotated and driven by the electric motor 51. The locking lever 53 is rotatably assembled to a support shaft 11*c* provided in the housing body 11.

The locking lever 53 has a sector gear 53*a* meshed with the worm 52, and also has an engagement portion (long hole) 53*b* linked with the engagement portion (pin portion) 41*a*3 of the main lever 41*a* in the active lever 41. Therefore, when the electric actuator A3 is actuated, the locking lever 53 is tilted by a drive force of the electric motor 51. In response to tilting of the locking lever 53, the active lever 41 is rotated. When the rotation of the active lever 41 is transmitted to the open link 33, the door is locked or unlocked. It should be noted that, in this embodiment, a formation angle of the sector gear 53*a* is substantially 45 degrees, so that an action response property in the case where the electric actuator A3 is actuated (time required for switching between lock and unlock of the door) is improved in comparison to an action response property of the electric actuator described in JP2006-266026A.

The locking lever 53 is provided with an operation portion 53*c* linked with a lock knob (not shown) provided on the indoor side of the door. The operation portion 53*c* is formed so as to be tilted integrally with the sector gear 53*a* and the engagement portion 53*b*. Therefore, when the lock knob provided on the indoor side of the door is actuated from an unlock state to a lock state (or, from the lock state to the unlock state) and the operation portion 53*c* is tilted, the engagement portion 53*b* of the locking lever 53 is integrally tilted, so that the active lever 41 is rotated. Then, the rotation of the active lever 41 is transmitted to the open link 33, thereby an unlocked state of the door is switched to a locked state (or, the locked state of the door is switched to the unlocked state). It should be noted that the sector gear 53*a* is also integrally rotated so as to take the worm 52 and the electric motor 51 around.

Figure 9:
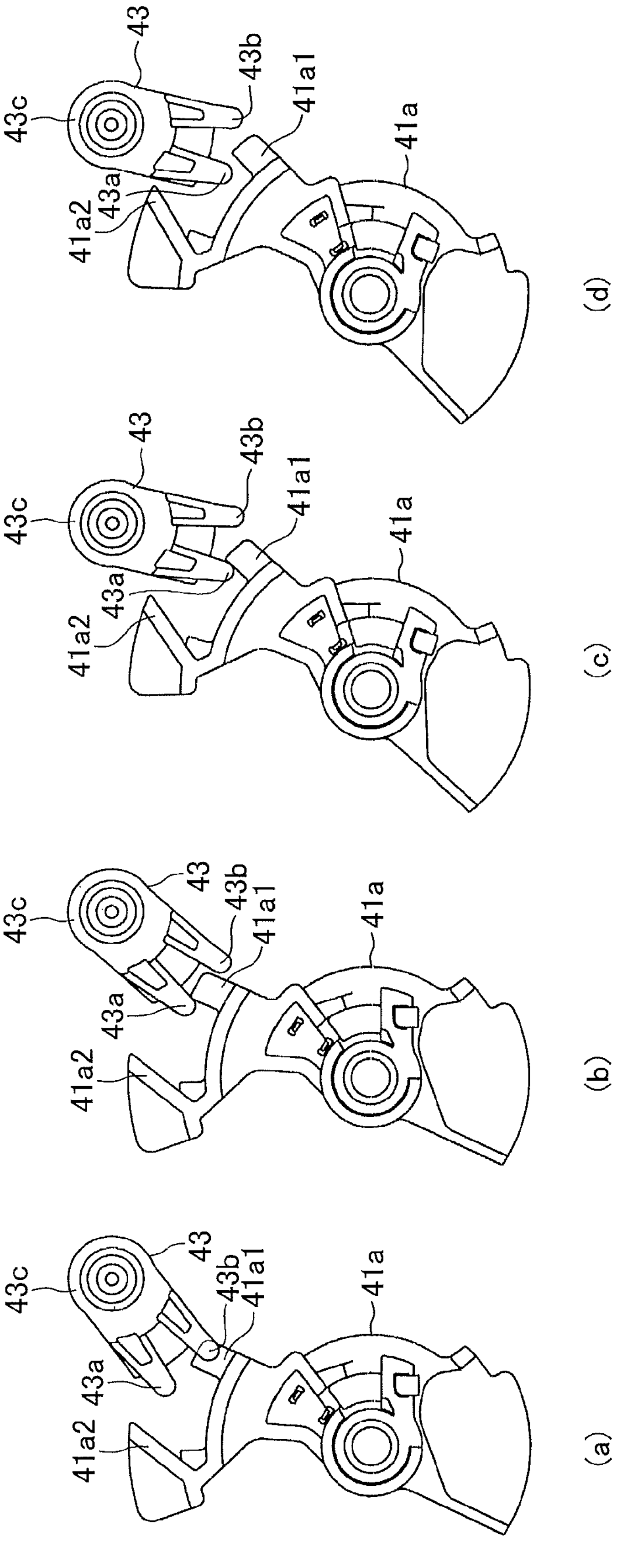
FIG. 9 is a view illustrating an actuation when a main lever of an active lever shown in FIGS. 2, 3, and 5 is turned by the key lever from the unlock state to the lock state.

In this embodiment, as shown in FIG. 9, in the case where the key cylinder 102 is operated to turn toward the lock direction from a default state (state where the key can be inserted into and pulled out from the key cylinder 102) when the main lever 41*a* of the active lever 41 is in the unlock state (state in (a) of FIG. 9), the first arm 43*a* of the key lever 43 moves (spins out) counterclockwise in FIG. 9 by a predetermined amount (rotation amount from the state (a) to a state (b) of FIG. 9) and after that engages with (abuts against) the first engagement portion 41*a*1 of the main lever 41*a*, so that the main lever 41*a* is turned in the lock direction. In the case that the main lever 41*a* of the active lever 41 turns to a state (c) of FIG. 9, the main lever 41*a* rotates from the state (c) to a state (d) of FIG. 9 by a function of the torsion spring S4 shown in FIG. 5 independently of the turn of the key lever 43.

Figure 10:
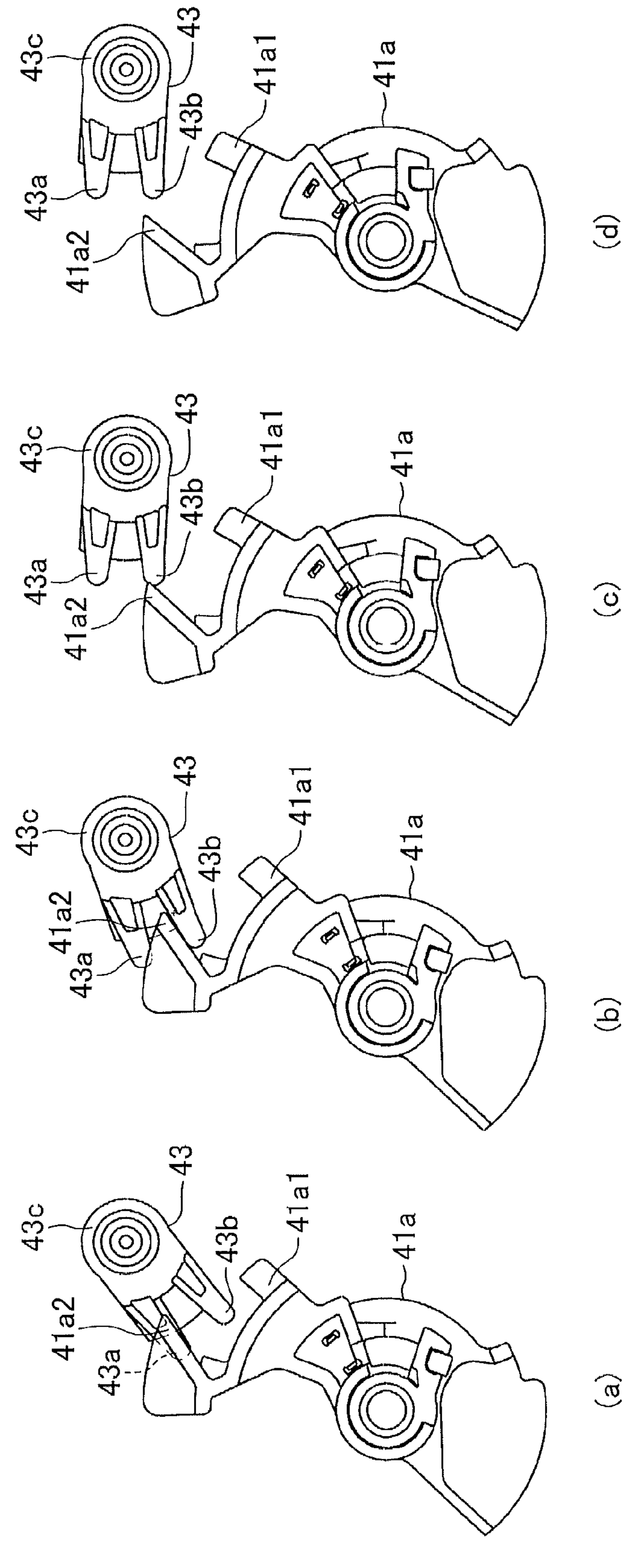
FIG. 10 is a view illustrating an actuation when the main lever of the active lever shown in FIGS. 2, 3, and 5 is turned by the key lever from the lock state to the unlock state.

Moreover, in this embodiment, as shown in FIG. 10, in the case where the key cylinder 102 is operated to turn toward the unlock direction from the default state when the main lever 41*a* of the active lever 41 is in the lock state (state in (a) of FIG. 10), the second arm 43*b* of the key lever 43 moves (spins out) clockwise in FIG. 10 by a predetermined amount (rotation amount from the state (a) to a state (b) of FIG. 10), and after that engages with (abuts against) the second engagement portion 41*a*2 of the main lever 41*a*, so that the main lever 41*a* is turned in the unlock direction. In the case that the main lever 41*a* of the active lever 41 turns to a state (c) of FIG. 10, the main lever 41*a* rotates from the state (c) to a state (d) of FIG. 10 by the function of the torsion spring S4 shown in FIG. 5 independently of the turn of the key lever 43.

Figure 11:
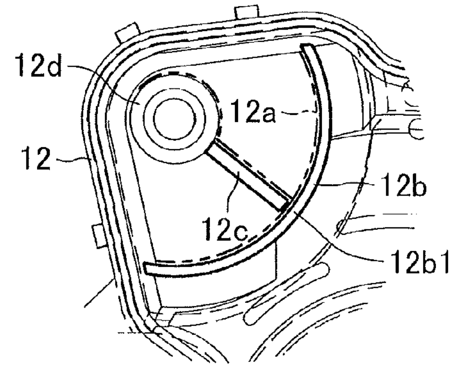
FIG. 11 is a side view of a portion of a housing cover for receiving the key lever in the housing shown in FIGS. 5 to 7 observed from the inside of the housing.
Figure 12:
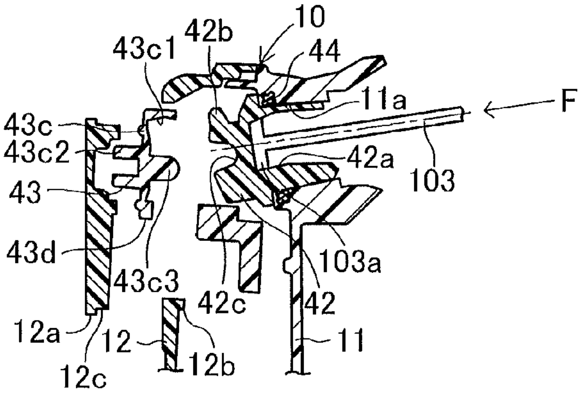
FIG. 12 is a cross sectional view showing a state when the key lever and the housing cover in the housing collapse due to an external force applied in a direction of a rod shaft to the key rotor shown in FIG. 6.
Figure 13:
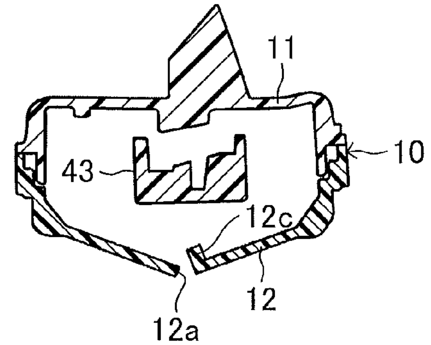
FIG. 13 is a cross sectional view of the portion corresponding to FIG. 7 when the housing cover in the housing collapses as shown in FIG. 12.

Moreover, in this embodiment, a weak portion 43*d* (refer to FIGS. 6 and 8) is provided between the hub 43*c* and the arms 43*a*, 43*b* of the key lever 43. The weak portion 43*d* is collapsible when the rod 103 is pushed to move toward the key lever 43 by a force equal to or more than a predetermined value. Moreover, a collapse assisting portion 12*a* is provided at a portion of the housing cover 12 of the housing 10 corresponding to the key lever 43, as indicated by an imaginary line in FIG. 11. This collapse assisting portion 12*a* is provided by forming an arc-shaped rib 12*b* which extends in an arc shape centering around a circular portion 12*d* rotatably supporting the key lever 43, and a straight rib 12*c* which extends linearly from the circular portion 12*d* toward an intermediate portion 12*b*1 of the arc-shaped rib 12*b* on an inner circumference side of the arc-shaped rib 12*b*. The straight rib 12*c* is slightly separated in the radial inward direction from the inner periphery of the intermediate portion 12*b*1 on the housing cover 12. As shown in FIG. 12, when the rod 103 is pushed to move toward the key lever 43 by a force F equal to or more than a predetermined value, the collapse assisting portion 12*a* itself collapses as shown in FIGS. 12 and 13, and thereby assists the collapse (refer to FIGS. 12 and 14) at the weak portion 43*d* of the key lever 43. It should be noted that the plate thickness of the collapse assisting portion 12*a* may properly be set, and the plate may have the same thickness as general portions or may be implemented in a thinner plate thickness than that of the general portions by providing a groove or the like.

Figure 15:
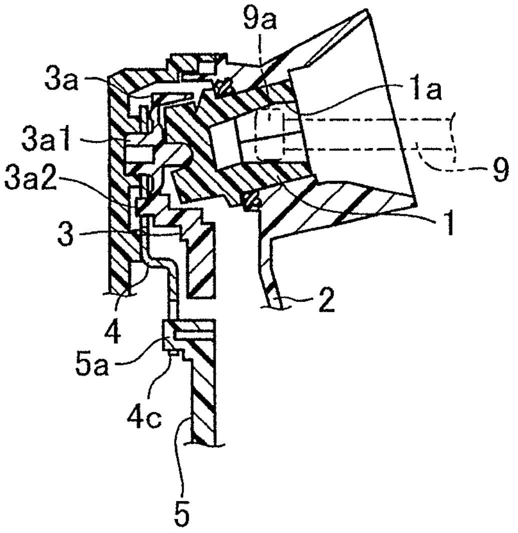
FIG.15 ( PRIOR ART)
FIG. 15 is a cross sectional view of a portion corresponding to FIG. 6 in a door lock device for the vehicle according to a related art.
Figure 16:
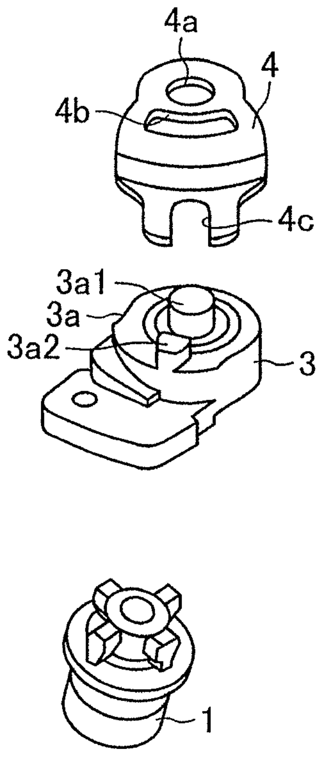
FIG.16 (PRIOR ART)
FIG. 16 is an exploded perspective view of the key rotor, the key lever, and an idle lever in the door lock device for the vehicle according to the related art shown in FIG. 15.

According to the door lock device for the vehicle Ao, the actuation in the case where the key cylinder 102 is operated to turn from the default state toward the lock direction when the main lever 41*a* of the active lever 41 is in the unlock state, and the actuation in the case where the key cylinder is operated to turn from the default state toward the unlock direction when the main lever 41*a* of the active lever 41 is in the lock state are substantially the same as the respective actions provided by the above-mentioned door lock device for the vehicle in the related art. Moreover, although the lever mechanism A4 which carries out the lock operation/unlock operation in response to the turn operation of the key cylinder 102 has the key rotor 42 and the key lever 43, the lever mechanism A4 does not have an idle lever (refer to an idle lever 4 in FIGS. 15 and 16). Therefore, the lever mechanism A4 no longer needs an idle lever, and the lever mechanism A4 of the door lock device Ao can be configured in a simple and inexpensive manner.

Moreover, in the door lock device for the vehicle Ao, the first arm 43*a* and the second arm 43*b* are provided so as to be displaced in the direction of rotation axis of the key lever 43 by a predetermined amount, the first arm 43*a* is incapable of engaging with the second engagement portion 41*a*2 of the main lever 41*a* in the active lever 41, and the second arm 43*b* is incapable of engaging the first engagement portion 41*a*1 of the main lever 41*a*. Thus, in the unlock state, the second arm 43*b* and the first engagement portion 41*a*1 can be arranged so as to be superposed in the direction of the rotation axis. Meanwhile, in the lock state, the first arm 43*a* and the second engagement portion 41*a*2 can be arranged so as to be superposed in the direction of the rotation axis. Thus, a gap between the first arm 43*a* and the second arm 43*b* can be reduced and size increase of the key lever 43 can be prevented.

Figure 14:
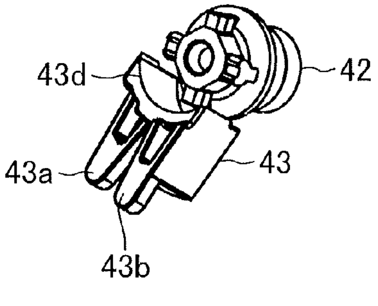
FIG. 14 is a perspective view showing a relation between the key rotor and the key lever when the key lever collapses as shown in FIG. 12.

Moreover, in the door lock device for the vehicle Ao, the weak portion 43*d* which is collapsible when the rod 103 is pushed to move toward the key lever 43 by the force F equal to or more than a predetermined value is provided between the hub 43*c* and both the arms 43*a*, 43*b* of the key lever 43. Therefore, when the rod 103 is pushed to move toward the key lever 43 by the force F equal to or more than a predetermined value, the key lever 43 collapses at the weak portion 43 as shown in FIGS. 12 and 14. Thus, the rotation is not transmitted from the hub 43*c* to each of the arms 43*a*, 43*b* in the key lever 43 in this state, and the active lever 41 will not rotate toward the unlock direction even when the key rotor 42 rotates toward the unlock direction. Therefore, an anti-theft function of the door lock device Ao can be enhanced.

Moreover, in the door lock device for the vehicle Ao, the collapse assisting portion 12*a* which assists collapse of the key lever 43 at the weak portion 43*d* when the rod 103 is pushed to move toward the key lever 43 by the force F equal to or more than a predetermined value is provided on the housing cover 12 of the housing 10. Therefore, the collapse of the key lever 43 at the weak portion 43*d* can be ensured when the rod 103 is pushed to move toward the key lever 43 by the force F equal to or more than a predetermined value and the anti-theft function of the door lock device Ao can be further enhanced, in comparison to the case where the collapse assisting portion 12*a* is not provided in the housing cover 12 of the housing 10. It should be noted that, when the collapse assisting portion 12*a* provided on the housing cover 12 of the housing 10 collapses as shown in FIGS. 12 and 13, the collapsed hub 43*c* of the key lever 43 can be dropped outside of the housing 10 through a gap in the vehicle width direction generated by the collapse of the housing cover 12.

Although the above-mentioned embodiment is implemented by providing the collapse assisting portion 12*a* on the housing cover 12 of the housing 10, embodiments without the collapse assisting portion 12*a* may be implemented. Moreover, although the above-mentioned door lock device for the vehicle Ao is implemented by providing the weak portion 43*d* between the hub 43*c* and the arms 43*a*, 43*b* of the key lever 43, embodiments in which the weak portion (43*d*) is provided only between the hub 43*c* and the second arm 43*b* of the key lever 43 may be implemented. It should be noted that embodiments without the weak portion 43*d* on the key lever 43 may be implemented.

Moreover, although the above-mentioned embodiment is implemented by configuring the key rotor 42 and the key lever 43 by independent members so as to be engageable with each other in a state where the rotation axis of the key rotor 42 is inclined relative to the rotation axis of the key lever 43, embodiments employing a configuration in which the key rotor (42) and the key lever (43) are coaxially arranged so as to be integrated to each other may be implemented. In this case, the lever mechanism (A4) can be configured by a single component, and thus the lever mechanism of the door lock device can be configured in an even simpler and more inexpensive manner.

The invention claimed is:

1. A door lock device for a vehicle comprising:

a lever mechanism being adapted to link through a rod with a key cylinder arranged on an outside handle of a vehicle door and carrying out a lock/unlock operation in response to turn operation of the key cylinder, the lever mechanism including;

a key rotor including a coupling hole to which an inner end of the rod is inserted in the vehicle width direction and coupled in a torque transmittable manner, the key rotor being rotatably assembled to a housing, and a key lever including a hub rotatably supported by the housing and the key rotor and connected to the key rotor in a torque transmittable manner, the key lever being arranged in the housing, the key lever including;

a first arm extending to radial outward direction from the hub and capable of engaging with a first engagement portion of an active lever rotatably assembled in the housing, and a second arm extending to radial outward direction from the hub and capable of engaging with a second engagement portion of the active lever; wherein in the case where the key cylinder is operated to turn toward a lock direction from a default state when the active lever is in an unlock state, the first arm of the key lever moves by a predetermined amount and after that engages with the first engagement portion of the active lever, so that the active lever is turned in the lock direction;

in the case where the key cylinder is operated to turn toward an unlock direction from the default state when the active lever is in a lock state, the second arm of the key lever moves by a predetermined amount and after that engages with the second engagement portion of the active lever, so that the active lever is turned in the unlock direction; and a weak portion is provided between the hub and the second arm of the key lever, the weak portion being collapsible when the rod is pushed to move toward the key lever by a force equal to or more than a predetermined value.

2. The door lock device for the vehicle according to claim 1, wherein:

the first arm and the second arm are provided so as to be displaced in the direction of rotation axis of the key lever;

the first arm is incapable of engaging with the second engagement portion; and the second arm is incapable of engaging with the first engagement portion.

3. The door lock device for the vehicle according to claim 1, wherein a collapse assisting portion that assists collapse at the weak portion of the key lever when the rod is pushed to move toward the key lever by a force equal to or more than a predetermined value is provided on the housing.

4. The door lock device for the vehicle according to claim 3, wherein the collapse assisting portion is configured by an arc-shaped rib and a straight rib, the arc-shaped rib extending in an arc shape centering around a circular portion rotatably supporting the key lever, and the straight rib extending on an inner circumference side of the arc-shaped rib.

5. The door lock device for the vehicle according to claim 4, wherein:

the straight rib extends from the circular portion toward an intermediate portion of the arc-shaped rib; and the straight rib and the arc-shaped rib are slightly separated from each other.

6. The door lock device for the vehicle according to claim 1, wherein the key rotor and the key lever are coaxially arranged and are integrated to each other.

* * * * *